D. PHILLIPS & W. REID.

Manufacture of Barrels.

No. 6,699. Reissued Oct. 11, 1875.

Witnesses.

J. M. Pool

W. T. Hutchinson

William Reid assignee of Dewey Phillips and Wm. Reid

By Thos. M. Healey

Attorney

N. PETERS, PHOTO-LITHOGRAPHER, WASHINGTON, D. C.

UNITED STATES PATENT OFFICE.

DEWEY PHILLIPS, OF SHAFTSBURY, VERMONT, AND WILLIAM REID, OF WEST HEBRON, NEW YORK, ASSIGNORS TO WILLIAM REID.

IMPROVEMENT IN THE MANUFACTURE OF BARRELS.

Specification forming part of Letters Patent No. 63,810, dated April 16, 1867; ressue No. 6,699, dated October 11, 1875; application filed June 10, 1875.

*To all whom it may concern:*

Be it known that DEWEY PHILLIPS, of Shaftsbury, county of Bennington, in the State of Vermont, and WILLIAM REID, of West Hebron, in the county of Washington and State of New York, invented a certain new and useful Improvement in the Manufacture of Barrels; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
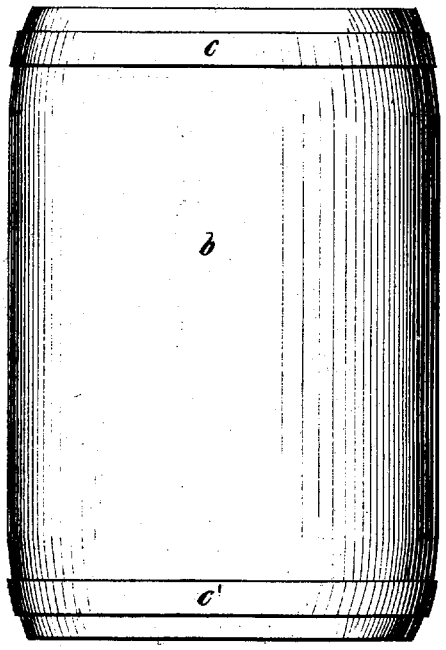
Figure 2:
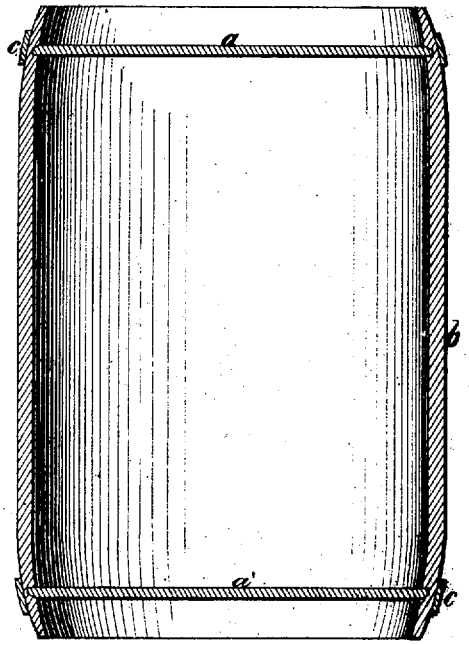

Figure 1 is an elevation of a cask completed according to the improved method; and Fig. 2, a section thereof, taken in the plane of the axis of the cask.

The said invention relates to a method of securing heads in casks or bottoms in tubs, pails, and such like articles made of wood, by annularly compressing and condensing the fibers of the wood forming the shell or cylindriform part of such casks, tubs, pails, &c.

Prior to the said invention, as far as any diminishing by pressure of the circle of the cylindriform part of such articles was concerned, the cooper's art was the art of coaptation, or the fitting together of parts accurately measured and made to fit one another when finished by such coaptation or fitting together, and the heads or bottoms were put in such articles by making the heads or bottoms of the exact diameter of the shell in the croze, and then by expanding the cylindriform part of the casks, tubs, or pails (in the case of seamless articles by steaming them, or where such articles are made of staves by separating the ends of the trussed-up staves) sufficiently to permit the heads or bottoms to be inserted, and the shrinkage of the wood by drying in the seamless article; or the closing together of the separated staves in the stave article, together with the putting on of the necessary hoops, were relied upon to secure and hold the heads or bottoms in the croze.

According to the improved method, the heads *a a'*, or the bottoms, are made of less diameter than the inner diameter of the cylindriform part or shell (by the word "shell" in these specifications is always meant the cylindriform part of a cask, tub, or pail, whether formed of a seamless tube or its equivalent, as far as compressibility is concerned) at the crose, so that they can be readily introduced without expanding or stretching the shell, and while the heads or bottoms are held in position pressure is applied to the shells at or near the ends and all around. The wood is compressed and its fibers condensed until the shell is made to fit the heads or bottom. Then, while the wood of the shell is so compressed, the necessary hoops *c c'* are placed thereon to hold the wood in the compressed condition.

The compression of the shell onto the heads or bottoms may be effected by means of a metallic cone or conical hoop driven or forced onto the cylindriform part or shell, or by means of an expanding and contracting ring, or conical ring made to expand or contract by means of a screw-bolt or wedge, or by any known means of producing concentric pressure. Any special machinery for effecting said compression is not, however, claimed; but it can be effected by the machine of WILLIAM REED patented in the year 1866.

After the shell has been compressed, and so held for a time, the wood has little or no tendency to expand or leave the heads, even when the hoops are removed or loosened, as the condensation and upsetting of the fibers of the wood by the compression gives the wood a set.

The securing of heads or bottoms to the cylindriform parts or shells of casks, tubs, pails, and other vessels of like character is not claimed; but,

What is claimed, and desired to be secured by Letters Patent, is—

The method herein described of putting the heads or bottoms in casks, or other vessels, by making the heads or bottoms of less diameter than the inner diameter of the shell or cylindriform part in the croze, and then compressing the ends of the shells in close contact therewith, and putting on the necessary hoops, substantially as described.

In testimony that the foregoing is claimed I have hereunto set my hand this 21st day of May, 1875.

WILLIAM REID.

Witnesses:
THOMAS REID,
N. CALLAN.